Figure 1:
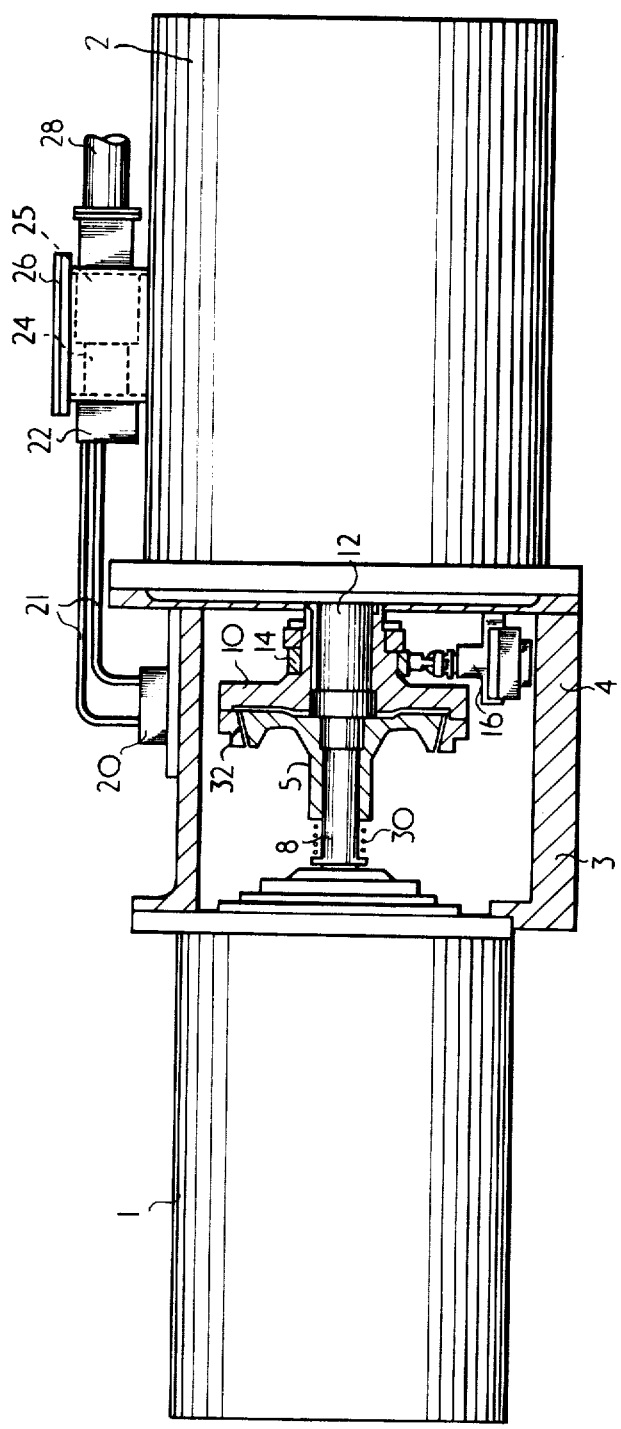

United States Patent [19]

Monks

[11] 4,039,057
[45] Aug. 2, 1977

[54] ELECTRIC MOTOR WITH FLUID OPERATED CLUTCH

[75] Inventor: Harry Monks, Burton-on-Trent, England

[73] Assignee: Coal Industry (Patents) Limited, London, England

[21] Appl. No.: 642,678

[22] Filed: Dec. 19, 1975

[30] Foreign Application Priority Data

Jan. 3, 1975   United Kingdom ............... 00260/75

[51] Int. Cl.² ............................................. F16D 23/00
[52] U.S. Cl. ............................... 192/.02 R; 192/.07; 192/.072; 192/85 R
[58] Field of Search ...................... 192/.02 R, .07, .072

[56] References Cited

U.S. PATENT DOCUMENTS

| | | | |
|---|---|---|---|
| 2,432,272 | 12/1947 | Bariffi | 192/.02 R |
| 2,487,702 | 11/1949 | Goodwillie et al. | 192/.02 R |
| 3,369,636 | 2/1968 | Nelson | 192/.02 R |

*Primary Examiner*—Benjamin W. Wyche
*Attorney, Agent, or Firm*—Stevens, Davis, Miller & Mosher

[57] ABSTRACT

A current transformer is provided in the terminal box of the conveyor drive motor to sense the operational mode of the motor and to actuate a solenoid in response to the sensed mode, the solenoid, in turn, actuating a hydraulic valve to control the operation of the clutch.

2 Claims, 2 Drawing Figures

ELECTRIC MOTOR WITH FLUID OPERATED CLUTCH

This invention relates to control means for controlling a hydraulically actuated clutch drivably connectible intermediate an electrical drive assembly and a driven assembly.

In particular, although not exclusively, the present invention relates to control means for controlling a clutch drivably connectible intermediate an electric drive motor and a gearbox for a conveyor installed along a working face in an underground mine.

Previously known such control means included a solenoid valve for controlling the supply of pressure fluid to a hydraulic relay valve which, in turn, controlled the supply of pressure fluid from a pump drivably connected to the drive motor to actuate the clutch. With such prior known control means an electrical supply cable was required in addition to the supply cable for the drive motor to energize the solenoid valve. The need for the additional electrical supply cable gave rise to problems associated with the protection of a relatively long, relatively weak electric cable installed in the hazardous conditions existing adjacent to a working face in an underground mine.

An object of the present invention is to reduce or eliminate the above mentioned problems.

According to the present invention control means for controlling a hydraulically actuated clutch drivably connectible intermediate an electrical drive assembly and a driven assembly comprises sensor means mountable on the electric drive means for sensing if electrical current is being supplied to the drive assembly, solenoid means energized in response to an output from the sensor means, and hydraulic valve means mechanically linked to the solenoid means and thereby actuated in response to the solenoid energized by said output of the sensor means.

Preferably, the sensor means comprises a transformer adapted to give an output when current is received from an electrical supply source.

Conveniently, the hydraulic valve means controls the feed of pressure fluid to a relay valve arranged to control feed of pressure fluid to the hydraulically actuated clutch.

Figure 2:
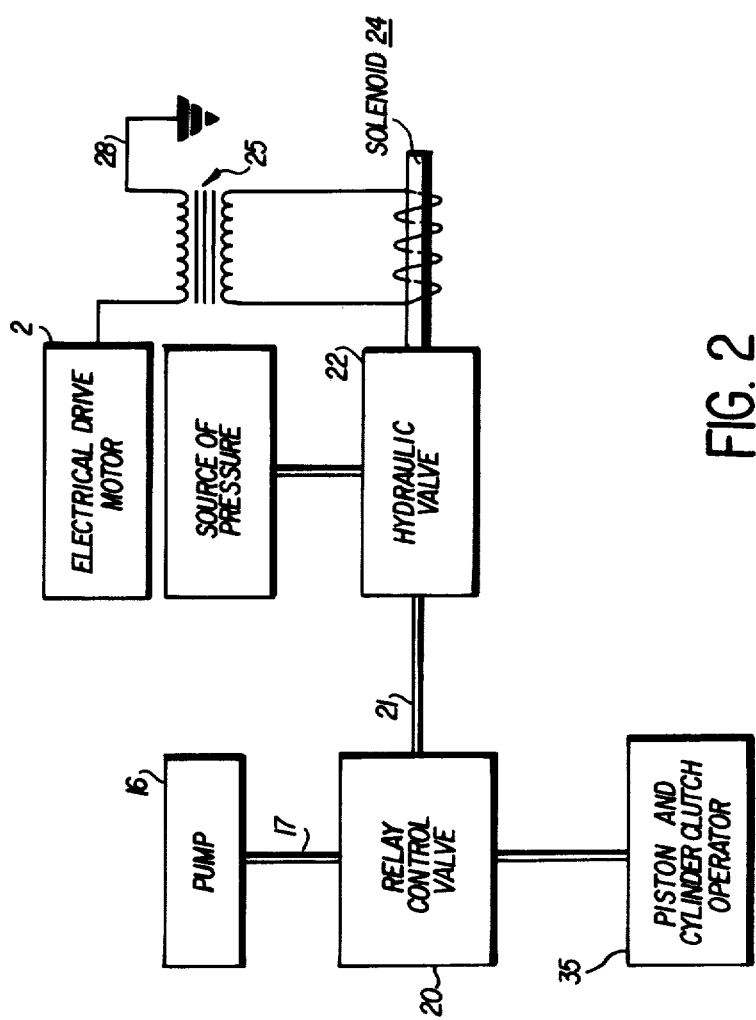

By way of example only, one embodiment of the present invention will be described with reference to the accompanying drawing in which FIG. 1 is a diagrammatic side view, partly in section, of drive equipment for a conveyor, the drive equipment including control means constructed in accordance with the present invention and FIG. 2 is a schematic diagram of a hydraulic circuit and an electrical circuit of the present invention.

The conveyor which is not shown in the drawings is of the type, for example, commonly installed on longwall faces in underground mines and comprising a series of pans arranged to provide a deck over which flight bars are hauled by at least one endless chain passing around sprockets situated in end frame components forming the ends of the conveyor. At least one of the sprockets drivably engages the chain and constitutes part of a driven assembly being drivably connected to a gearbox 1 shown in the drawing.

The gearbox 1 is drivably connectible to a drive assembly including an electrical drive motor 2 via a clutch 3 housed within a housing 4 and comprising a spring-loaded inner member 5 which is biassed towards a disengaged position and which is drivably mounted on a shaft 8 of the gearbox 1 and an outer member 10 which is drivably mounted on a shaft 12 of the electric drive motor 2 and which is provided with a non-rotary collar 14 mounted eccentrically on the outer member so that as the outer member rotates the collar is reciprocated to and fro thereby driving a submerged pump 16 fixedly mounted on the inner wall of the housing 4. When driven the pump 16 feeds pressure fluid to a relay control valve 20 fixedly mounted on the outer wall of the housing 1. The relay control valve 20 is activated by pressure fluid fed through pipes 21 from a hydraulic valve 22 which in turn is actuated by a solenoid 24 which is mounted in an input terminal block 26 for the electric drive motor 2 and which is mechanically linked to the hydraulic valve 22. The solenoid valve 24 is energized by a transformer 25 which senses the current from an electrical supply source fed through a supply cable 28 (only one end of which is shown).

In operation, with the motor switched off, the spring-loaded inner member 5 is biassed into its disengaged position by spring 30. When the drive motor is switched on, the current in the supply cable 28 is sensed by the transformer 25 in the terminal block 26 and gives an output to energize the solenoid 24 which thereby actuates the hydraulic valve 22 via the said mechanical linkage to feed pressure fluid via pipes 21 to actuate the relay control valve 20. Simultaneously, the outer member 10 of the clutch 3 starts to rotate with the drive motor 2 to drive the pump 16 via its reciprocating drive. Thus, the pump 16 feeds pressure fluid from within the housing to the relay control valve 20 through pipes 17. By the time the drive motor has reached full speed the pump 16 is delivering sufficient fluid pressure to the relay control valve 20 which has already been actuated by pressure fluid fed along pipes 21 as previously described. Consequently, fluid pressure from the pump 16 is fed to piston and cylinder arrangements or clutch operator 35 provided in the clutch 3 to urge the inner member 5 against its spring loading so that the frusto conical working surfaces 32 of the clutch contact to drive the inner member 5 and, thereby, the conveyor via the gearbox 1.

Upon the drive motor being switched off to stop the conveyor, the transformer in the terminal block 26 senses the lack of current from the electrical supply source and thereby gives no output consequently de-energizing the solenoid 24 which correspondingly actuates the hydraulic valve 22 via the mechanical linkage to shut off the supply of pressure fluid along the pipes 21. Thus, the relay control valve 20 is actuated to exhaust the feed from the pump 16 which is still being driven by the drive motor which is still rotating due to its relatively large kinetic energy. The inner member 5 of the clutch moves under its spring loading to its disengaged position, thereby, disconnecting the gearbox 1 from the rotating drive motor and allowing the conveyor 1 to be brought to rest relatively quickly. The disconnected drive motor is then allowed to freely run down.

It will be seen from the above description that the present invention provides control means for a clutch for conveyor drive equipment which apart from the main electric supply cable to the drive motor does not require any additional electric cables. The control is simple, compact and robust.

In other embodiments of the invention the control means control a brake unit for the conveyor in addition to the clutch.

In still further embodiments of the invention the relay control valve is dispensed with and the clutch is actuated directly from the hydraulic valve.

I claim:

1. Control means for controlling a hydraulically actuated clutch drivably connectable intermediate an electrical drive assembly and a driven assembly, comprising sensor means mountable on the electric drive assembly for sensing if electrical current is being supplied to the drive assembly, solenoid means energized in response to an output from the sensor means, hydraulic valve means mechanically linked to the solenoid means and thereby actuated in response to the solenoid means being energized by said output of the sensor means, relay control means hydraulically linked to the hydraulic valve means and thereby actuated in response to actuation of the hydraulic valve means, and hydraulic pump means driven by the electrical drive assembly to supply hydraulic fluid for actuating the clutch and being hydraulically connected thereto by the relay control means when it is actuated.

2. Control means as claimed in claim 1, in which the sensor means comprises a transformer adapted to give an output when current is received from an electrical supply source.

* * * * *